United States Patent Office 3,329,520
Patented July 4, 1967

3,329,520
REFRACTORY BINDER COMPRISING ORGANIC SILICATES
Harold Garton Emblem, Grappenhall, and Charles Edward Oxley, Warrington, England, assignors to Philadelphia Quartz Company, Philadelphia, Pa., a corporation of Pennsylvania
No Drawing. Filed June 5, 1963, Ser. No. 285,580
Claims priority, application Great Britain, June 6, 1962, 21,843/62
6 Claims. (Cl. 106—287)

This invention relates to liquid compositions comprising organic silicates.

According to the invention there is provided a liquid composition suitable for use as a binder for refractory powder when diluted with water, comprising a mixture of an alkyl silicate having up to 4 carbon atoms in each alkyl group and an aminoalkyl silicate which is capable of forming a gel when mixed with water, the amount of the aminoalkyl silicate being up to 20% by volume of the mixture, and preferably at least 1% by volume of the mixture.

The alkyl silicate may for example be methyl, ethyl or isopropyl silicate. Orthosilicates or polysilicates or mixtures thereof may be used.

Suitable aminoalkyl silicates are found among the general class of aminoalkyl silicate esters which may be used in the processes described and claimed in U.S. Patent 3,112,538. The preferred aminoalkyl silicates are orthosilicates. For optimum results all the ester groups of the aminoalkyl silicate should be amino-substituted ester groups. Furthermore, the amino-substituted ester groups are preferably those derived from an amino-alcohol of the formula $RNH_2$ where R is a hydroxyalkyl group containing 2 to 5 carbon atoms. Examples of suitable aminoalkyl silicates are tetra (2-amino-ethoxy) silane, tetra (2-amino-2-methyl-propoxy) silane and tetra (2-amino-butoxy) silane.

The liquid composition may also comprise isopropanol or other mutual solvent for water and the alkyl and aminoalkyl silicates.

The liquid compositions of the invention are stable but gel on addition of water. The gelation time is dependent both on the proportion of aminoalkyl silicate present and on the amount of water added. Control of the gelation time is possible by varying the amounts of either or both of these materials.

The aminoalkyl silicate is an accelerator for the hydrolysis and gelation of the alkyl silicate. Although amines such as monoethanolamine and piperidine have long been known as suitable agents for accelerating the gelation of ethyl silicate, it has never before been proposed to use a silicon compound as the accelerator. The reduction in the silica content of silicate binder liquids which occurs when accelerators are added is counteracted by the use, in accordance with the present invention, of an accelerator in the form of a silicon compound which hydrolyzes to silica gel.

To prepare refractory objects, such as crucibles, water and a refractory powder are added to a composition of the invention and the resulting mixture cast into the desired shape and the binder liquid allowed to set. The cast article is then fired at a high temperature to mature the bond.

The following examples illustrate the invention.

Example 1

Various mixtures of isopropyl silicate (38% $SiO_2$) and tetra (2-aminoethoxy) silane were prepared and to 20 ml. of the mixtures various volumes of water were added and the time for the compositions to set to a solid gel were measured. The details and results of these experiments are tabulated below.

| Percent isopropyl silicate (by vol.) in the mixture | Percent tetra-(2-aminoethoxy) silane (by vol.) in the mixture | Mls. of water added | Gel time of the composition |
|---|---|---|---|
| 95 | 5 | 1 | 7 mins. 10 secs. |
| 95 | 5 | 2 | 8 mins. 45 secs. |
| 95 | 5 | 4 | 20 mins. 50 secs. |
| 95 | 5 | 6 | 31 mins. 50 secs. |
| 92.5 | 7.5 | 1 | 4 mins. 5 secs. |
| 92.5 | 7.5 | 2 | 5 mins. 10 secs. |
| 92.5 | 7.5 | 10 | 21 mins. 30 secs. |
| 90 | 10 | 2 | 2 mins. 5 secs. |
| 90 | 10 | 4 | 2 mins. 0 secs. |
| 85 | 15 | 0.5 | More than 1½ hrs. |
| 85 | 15 | 0.75 | 5 mins. 0 secs. |
| 85 | 15 | 1.0 | 1 min. 40 secs. |
| 85 | 15 | 2.0 | 1 min. 15 secs. |

Example 2

A mixture of 190 ml. of ethyl silicate (40% $SiO_2$) and 10 ml. of tetra (2-aminoethoxy) silane was prepared. 20 ml. of this mixture when mixed with 10 ml. of a mixture of 85% isopropyl alcohol containing 1% by volume of water and 15% water (by volume) gelled in 2 minutes giving a hard gel.

Example 3

A mixture of 90 ml. of isopropyl silicate (38% $SiO_2$) and 10 ml. of tetra (2-methyl-2-amino-propoxy) silane was prepared. 20 ml. of this mixture, when mixed with 4 ml. of water gelled in 54 minutes.

A mixture of 80 ml. of isopropyl silicate (38% $SiO_2$) and 20 ml. of tetra (2-methyl-2-amino-propoxy) silane was prepared. The following gel times were observed:

20 ml. mixture, with 4 ml. water—gel in 23½ minutes.
20 ml. mixture, with 3 ml. water—gel in 12¼ minutes.
20 ml. mixture, with 2 ml. water—gel in 10 minutes.

Example 4

A refractory crucible was prepared in the following manner.

100 g. of sillimanite powder was added to a mixture of 9.5 ml. isopropyl silicate (38% $SiO_2$), 0.5 ml. tetra (2-aminoethoxy) silane, 2 ml. water and 6 ml. isopropanol. The resulting slurry was poured into a crucible mould, allowed to dry in air overnight, then fired at 1200° C. for 8 hours to give a hard crucible.

The sillimanite powder used has the grading given in Tables 1 and 2 on page 15 of the Foundry Trade Journal, July 7, 1960, under the heading Grade P.

Example 5

A crucible was prepared by casting in a brass mould a slurry prepared from:

140 g. sillimanite powder (as used in Example 4).
20 ml. of the ethyl silicate-tetra (2-aminoethoxy) silane mixture used in Example 2.
7.5 ml. of the isopropyl alcohol-water mixture used in Example 2.

This slurry set in about three minutes. The crucible as cast was flexible and rubbery when stripped from the mould, but became hard after air-drying overnight. The crucible was fired at 1200° C. for 8 hours.

Example 6

A crucible was prepared by casting into a brass mould a slurry prepared from:

100 g. sillimanite powder (as used in Example 4).

20 ml. of mixture of 80 ml. isopropyl silicate (38% $SiO_2$) and 20 ml. of tetra (2-methyl-2-amino-propoxy) silane. 4 ml. of water.

The crucible obtained was quite firm on stripping from the mould. The crucible was fired at 1200° for 8 hours.

The use of an aminoalkyl silicate as hydrolysis and gelation accelerator for the silicate binder as described in the examples has been found to give a refractory body of green strength (i.e. strength of the bound refractory before firing) superior to that obtained by using ethyl silicate and the usual amine accelerators such as piperidine.

It was furthermore observed in carrying out the experiments of Example 1 that the viscosity of the mixture of isopropyl silicate, tetra (2-aminoethoxy) silane and water was substantially constant until close to the end of the time required for gelation of the mixture, and that the gelation then took place relatively rapidly. This property of these liquid compositions is valuable in that when the compositions are mixed with refractory powders and the resulting slurries cast into the desired shape, good packing of the refractory can take place before the binder hardens.

What is claimed is:

1. A liquid composition suitable for use as a binder for refractory powder when diluted with water which consists essentially of a mixture of:
   (a) an alkyl silicate having up to 4 carbon atoms in each alkyl group, and
   (b) an aminoalkyl orthosilicate which is capable of forming a gel, when mixed with water,
      the amount of said aminoalkyl orthosilicate ranging between 1% and 20% by volume of the mixture.

2. A composition according to claim 1 wherein said aminoalkyl orthosilicate is selected from the group consisting of tetra (2-amino-ethoxy) silane, tetra (2-amino-2-methyl-propoxy) silane and tetra (2-amino-butoxy) silane.

3. A composition according to claim 1 wherein the alkyl silicate is selected from the group consisting of ethyl and isopropyl silicates.

4. A composition according to claim 2 wherein the alkyl silicate is selected from the group consisting of ethyl and isopropyl silicates.

5. A method of making a refractory object which comprises the steps of adding water and a particulate refractory material to a liquid composition as claimed in claim 1; casting the resulting mixture into the desired shape; allowing the liquid composition to set to a gel; and firing the cast article.

6. A method of making a refractory object which comprises the steps of adding water and a particulate refractory material to a liquid composition as claimed in claim 2; casting the resulting mixture into the desired shape; allowing the liquid composition to set to a gel; and firing the cast article.

References Cited

UNITED STATES PATENTS

| | | |
|---|---|---|
| 2,885,419 | 5/1959 | Beinfest et al. |
| 3,070,861 | 1/1963 | Emblem et al. _____ 22—193 |
| 3,079,656 | 3/1963 | Emblem et al. |
| 3,112,538 | 12/1963 | Emblem _____ 22—193 |

FOREIGN PATENTS 154,835   12/1949   Australia.

MORRIS LIEBMAN, *Primary Examiner.*

A. LIEBERMAN, *Assistant Examiner.*